United States Patent [19]

Lopez

[11] Patent Number: 4,474,935

[45] Date of Patent: Oct. 2, 1984

[54] STABLE PRECATALYZED SATURATED EPOXY RESIN COMPOSITIONS

[75] Inventor: John A. Lopez, Houston, Tex.

[73] Assignee: Shell Oil Company, Houston, Tex.

[21] Appl. No.: 496,370

[22] Filed: May 20, 1983

[51] Int. Cl.$^3$ .................... C08G 59/14; C08G 59/24
[52] U.S. Cl. ...................................... 528/93; 528/94; 528/408
[58] Field of Search ........................ 528/93, 94, 408; 252/182

[56] References Cited

U.S. PATENT DOCUMENTS

| | | | |
|---|---|---|---|
| 2,633,458 | 3/1953 | Shokal | 528/109 X |
| 3,336,241 | 8/1967 | Shokal | 260/2 |
| 3,477,990 | 11/1969 | Dante et al. | 260/47 |
| 3,547,881 | 12/1970 | Moeller et al. | 260/47 |
| 3,824,212 | 7/1974 | Sinnema et al. | 528/93 |
| 3,978,027 | 8/1976 | Marshall | 260/47 EP |
| 4,255,553 | 3/1981 | Mizumura et al. | 528/93 |
| 4,320,222 | 3/1982 | Lopez | 528/89 |

*Primary Examiner*—Earl A. Nielsen
*Attorney, Agent, or Firm*—Norris E. Faringer

[57] ABSTRACT

The present invention is directed to storage-stable precatalyzed polyepoxides containing a catalytic amount of an ammonium salt and to a process for preparing higher molecular weight polyepoxides by reacting the precatalyzed polyepoxide with a polyhydric phenol or polymeric fatty acid.

12 Claims, No Drawings

STABLE PRECATALYZED SATURATED EPOXY RESIN COMPOSITIONS

FIELD OF THE INVENTION

The present invention is directed to a precatalyzed saturated epoxy resin composition, to a process for preparing higher molecular weight polyepoxides and to the products made therefrom.

BACKGROUND OF THE INVENTION

The use of precatalyzed polyepoxide compositions and their subsequent reaction with phenols is well known. See, for example, U.S. Pat. No. 3,477,990, which is directed to precatalyzed polyepoxides containing phosphonium halides as well as their reaction with phenols.

It is also known that the polyepoxide/phenolic reaction can be catalyzed by phosphines as disclosed in U.S. Pat. No. 3,547,881 and by potassium iodide as disclosed in U.S. Pat. No. 3,978,027.

It is further known from U.S. Pat. No. 4,320,222 that high temperature storage stability of such precatalyzed epoxy compositions is improved by the addition of a small amount of an alkali metal halide or hydroxide to the compositions of U.S. Pat. No. 3,477,990.

In general, the catalysts employed in the prior art compositions noted above are quite suitable for conventional epoxy resins, i.e., glycidyl ethers of bisphenols. However, the use of such catalysts such as the phosphonium halides of U.S. Pat No. 3,477,990 do not impart sufficient storage stability to the saturated epoxy resins, particularly at elevated temperature.

Accordingly, it has now been found that saturated epoxy resins can be precatalyzed and yet be storage stable, by the addition of an ammonium salt, particularly an ammonium halide.

SUMMARY OF THE INVENTION

The present invention is directed to a storage-stable precatalyzed polyepoxide containing a catalytic amount of an ammonium salt, especially an ammonium halide. The present invention is further directed to a process for reacting these precatalyzed epoxy compositions with other compounds, especially with polymeric fatty acids to prepare esters and with phenols to produce, via fusion reaction, high molecular weight polyepoxides.

DESCRIPTION OF THE PREFERRED EMBODIMENTS

Saturated Epoxy Resins

The epoxy compounds useful in the present compositions include those compounds derived from polyhydric phenols and having at least one vicinal epoxy group wherein the carbon-to-carbon bonds within the six-membered ring are saturated. Such epoxy resins may be obtained by two well known techniques, i.e., (1) by the hydrogenation of glycidyl polyethers of polyhydric phenols, or (2) by the reaction of hydrogenated polyhydric phenols with epichlohydrin in the presence of a Lewis Acid catalyst and a subsequent dehydrochlorination in an alkaline medium. The method of preparation forms no part of the present invention and the resulting saturated epoxy resins derived by either method are suitable in the present compositions.

Briefly, the first method comprises the hydrogenation of glycidyl polyethers of polyhydric phenols with hydrogen in the presence of a catalyst consisting of rhodium or ruthenium supported on an inert carrier at a temperature below about 50° C. This method is thoroughly disclosed in U.S. Pat. No. 3,336,241, and is suitable for use in preparing saturated epoxy resins. Accordingly, the relevant disclosure of U.S. Pat. No. 3,336,241 is incorporated herein by reference.

The second method comprises the condensation of a hydrogenated polyphenol with an epihalohydrin, such as epichlorohydrin, in the presence of a suitable catalyst such as $BF_3$, followed by the dehydrohalogenation in the presence of caustic. When the phenol is hydrogenated bisphenol A, the resulting saturated epoxy compound is sometimes referred to as "diepoxidized hydrogenated bisphenol A", or more properly as the diglycidyl ether of 2,2-bis(4-cyclohexanol)propane.

In any event, the term "saturated epoxy resin", as used herein shall be deemed to mean the glycidyl ethers of polyhydric phenols wherein the aromatic ring structure of the phenols is or has been saturated.

An idealized structural formula representing the preferred saturated epoxy compounds is as follows:

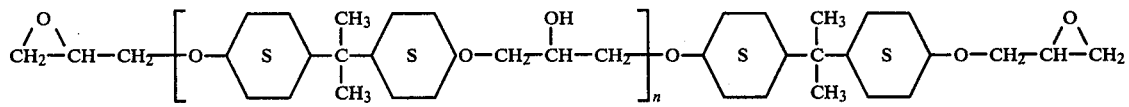

wherein n has a value so that the average molecular weight of the saturated polyepoxide is from about 350 to about 2500.

AMMONIUM SALTS

The catalyst used in the present composition are the ammonium salts conforming to the formula

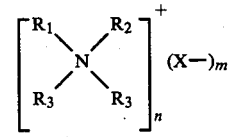

wherein each R is a hydrocarbon radical, and preferably an alkyl, aryl, alkenyl, cycloalkyl, cycloalkenyl or alkaryl radical containing up to 12 carbon atoms, X is an anion of a acid, preferably an inorganic acid, m is the valency of the X ion and n=m. Preferred ions X include halogen, sulfate, nitrate, phosphate and acetate. Especially preferred are the halogen ions.

Examples of suitable ammonium salts include, among others, benzyltrimethylammonium sulfate, benzyltrimethylammonium nitrate, diphenyldimethylammonium chloride, benzyltrimethylammonium chloride, dicyclohexyldialkyl ammonium iodide, tetrabutylammonium bromide, tetrabutylammonium chloride, tetrabutylammonium iodide.

Especially preferred are the tetraalkyl ammonium halides such as tetrabutyl ammonium bromide, chloride and iodide.

The amount of the ammonium halide catalyst will vary over a wide range. In general, the amount of ammonium halide will vary from about 0.001% to about 10% by weight of the saturated polyepoxide, and preferably from about 0.05% to about 5% by weight.

As noted hereinbefore, these storage stable, catalyzed polyepoxide compositions may be reacted with phenols to produce higher molecular weight fusion resins which can be subsequently cured with conventional epoxy curing agents to produce surface coatings, adhesives, laminates, etc.

PHENOLS

Suitable phenols include those compounds possessing at least one hydroxyl group attached to an aromatic nucleus. The phenols are monohydric or polyhydric and are substituted, if desired, with a great variety of different types of substituents. Examples of the phenols include among others, phenol, resorcinol, o-cresol, m-cresol, p-cresol, chlorophenol, nitrophenol, hydroquinone, 2,2-bis(4-hydroxyphenyl)propane, 2,2-bis(4-hydroxyphenyl)-pentane, and the like, and polymeric type polyhydric phenols obtained by condensing monohydric or polyhydric phenols with formaldehyde.

Preferred phenols to be used are the polyhydric phenols containing from 2 to 6 OH groups and up to 30 carbon atoms. Coming under special consideration are the phenols of the formula

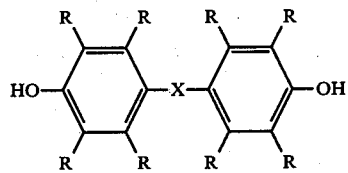

wherein X is a polyvalent element or radical and R independently is a member of the group consisting of hydrogen, halogen and hydrocarbon radicals. The preferred elements or radicals represented by X are oxygen, sulfur, —SO—, —SO$_2$—, divalent hydrocarbon radicals containing up to 10 carbon atoms and oxygen, silicon, sulfur or nitrogen containing hydrocarbon radicals.

Various examples of phenols that may be used in the invention are also given in U.S. Pat. No. 3,477,990 (e.g., column 5, line 1 to column 6, line 10) and it is to be understood that so much of the disclosure of that patent relative to examples of phenols is incorporated by reference into this specification.

The amount of the pre-catalyzed epoxide and the phenol to be employed in the process varies over a wide range depending upon the type of reactants and the type of product to be produced. In general, these reactants are used in approximately chemical equivalent amounts, i.e., a chemical equivalent amount of the phenol will be that sufficient to furnish one phenolic hydroxyl for every epoxy group to be reacted. For example, if one is reacting a diepoxide with a monohydric phenol and both epoxy groups are to be reacted, one mole of diepoxide should be reacted with about two moles of the monohydric phenol. On the other hand, if one is reacting a diepoxide with a dihydric phenol and a monomer product is desired by reacting both epoxide groups, one should react one mole of the diepoxide with about 2 moles of the polyhydric phenol. If a polymeric product is desired smaller ratios should be utilized as desired, such as, for example, 4 moles of the diepoxide and 5 moles of the polyhydric phenols.

Superior results are obtained when the higher molecular weight resins are produced and in this case the ratios of reactants are varied depending upon the molecular weight desired and upon the type of end groups, i.e., whether the product is to be terminated with an epoxide or with a phenol.

The reaction is conducted in the presence or absence of solvents is easily effected without the addition of solvents or diluents. However, in some cases, where either or both reactants are solids or viscous liquids it is desirable to add diluents to assist in effecting the reaction. Examples of such materials include the inert liquids, such as inert hydrocarbons as xylene, toluene, cyclohexane and the like.

If solvents are employed in the reaction and the resulting product is to be used for coating purposes, the solvent is typically retained in the reaction mixture. Otherwise, the solvent is removed by any suitable method such as by distillation or the like.

This so-called fusion technique is well-known and is more fully described in U.S. Pat. No. 3,477,990 and in U.S. Pat. No. 4,320,222 and such description is hereby incorporated herein by reference.

The solid fusion resins proposed by reacting the lower molecular weight precatalyzed saturated resins with a polyhydric phenol can be reacted with conventional epoxy curing agents to form hard, insoluble, infusible products.

Examples of suitable curing agents include, among others, the poly-basic acids and their anhydrides such as the di, tri- and higher carboxylic acids; those acids containing sulfur, nitrogen, phosphorus or halogens; amino-containing compounds such as, for example, diethylene triamine and pyridine; polyamides containing active amino and/or carboxyl groups; and others.

The amount of curing agent varies considerably depending upon the particular agent employed. For the alkalies or phenoxides, 1% to 4% by weight is generally suitable. With phosphoric acid and esters thereof, good results are obtained with 1 to 10% by weight added. The tertiary amine compounds are preferably used in amounts of about 1% to 15% by weight. The acids, anhydrides, polyamides, polyamines, polymercaptans, etc. are preferably used in at least 0.8 equivalent amounts, and preferably 0.8 to 1.5 equivalent amounts. An equivalent amount refers to that amount needed to given on active hydride (or anhydride group) per epoxy group.

Solvents or diluents are sometimes added to make the composition more fluid or sprayable. Preferred solvents or diluents include those which are volatile and escape from the polyepoxide composition before or during cure such as esters, chlorinated hydrocarbons and the like. To minimize expense, these active solvents are often used in admixture with aromatic hydrocarbons such as benzene, toluene, xylene, etc. and/or alcohols such as ethyl, isopropyl or n-butyl alcohol. Solvents which remain in the cured compositions are used, such as diethyl phthalate, dibutyl phthalate and the like, as well as cyanosubstituted hydrocarbons, such as acetonitrile, propionitrile, adiponitrile, benzonitrile, and the like. It is also convenient to employ normally liquid glycidyl compounds, glycidyl cyclopentyl ether, diglycidyl ether, glycidyl ether of glycerol and the like, and mixtures thereof.

Other materials are also added to the composition as desired. This includes other types of polyepoxides such as described in U.S. Pat. No. 3,477,990. This also includes fillers, such as sand, rock, resin particles, graphite, asbestos, glass or metal oxide fibers, and the like, plasticizers, stabilizers, asphalts, tars, resins, insecticides, fungicides, anti-oxidants, pigments, stains and the like.

The temperature employed in the cure varies depending chiefly on the type of curing agent. The amine-containing curing agents generally cure at or near ambient temperature and no heat be applied. The acids, anhydrides, and melamine derivatives, on the other hand, generally require heat, such as temperatures ranging from about 65° C. to about 210° C. Preferred temperatures range from about 90° C. to about 210° C. and more preferably from about 120° C. to 195° C.

To illustrate the manner in which the invention may be carried out, the following examples are given. It is to be understood, however, that the examples are for the purpose of illustration and the invention is not to be regarded as limited to any of the specific materials or conditions recited therein. Unless otherwise indicated, parts are parts by weight.

Polyether A is a diglycidyl polyether of hydrogenated 2,2-bis(4-hydroxyphenyl) propane having an average molecular weight of 426 and a weight per epoxy (WPE) of 234.

Polyether B is a diglycidyl polyether of 2,2-bis(4-hydroxyphenyl) propane having an average molecular weight of about 380 and a WPE of about 190 containing 0.1% by weight of ethyl triphenyl phosphonium iodide (TPPEI).

EMPOL 1024 is a $C_{36}$ dibasic dimer acid produced by the polymerization of unsaturated fatty acids having an Acid Value of 189-197; Saponification Value of 191-199 and a Neutralization Equivalent of 285-297.

EXAMPLES 1 to 8

In Examples 1 to 4, various ammonium catalysts were dissolved in Methyl Cellosolve and added on a molar basis to Polyether A with stirring. The precatalyzed Polyether A resin solutions were stored at both 120° F. and 200° F. The catalyst activity was then measured initially and periodically during storage. An abbreviated test for the epoxy/-carboxyl reaction was used to assess catalyst activity. This test consists of weighing 10 grams of the precatalyzed Polyether A and 5 grams of a dimer acid (EMPOL 1024) into an aluminum pan, thoroughly mixing, and placing in a 300° F. oven for three hours. Zero residual acidity indicates complete reaction. The results are tabulated in Table 1.

In Example 5 the procedure of Examples 1-4 were repeated except that the Polyether A was catalyzed with TPPEI.

In Example 6, the stability of Polyether B is evaluated as in Examples 1-6.

In Examples 7 and 8 two other conventional catalysts were employed, i.e., Zirconium octoate and lithium naphthenate.

The results of Examples 5, 6 and 7 are also tabulated in Table 1.

The data in Table 1 clearly illustrates the supporting of the ammonium halides as a catalyst for saturated epoxy resins.

EXAMPLE 9

Upstaged (fusion) resins were prepared with BPA using the precatalyzed resins of Examples 1-4. All three ammonium catalyst systems gave resins with target weight per epoxy (WPE) and adequate dump stability. The upstaged resins can be cured with conventional epoxy curing agents such as acids, anhydrides (TMA), amines, imidazoles, and the like. EXAMPLE 10

Dimer acid adducts (acid/epoxy equivalent ratio =0.400) were batched prepared with the precatalyzed resins of Examples 1-4 and the final properties of the resins were on target.

TABLE 1

| | STABILITY: RESIN/CATALYST AT 200° F. RESIDUAL ACIDITY | | | | | | | | |
|---|---|---|---|---|---|---|---|---|---|
| | | | ACID VALUE | | | | | | |
| EXAMPLE | CATALYST | % w | Initial | 1 Day | 2 Days | 3 Days | 4 Days | 5 Days | 8 Days |
| 1 | Tetramethylammonium Chloride | 0.15 | 0 | 0 | 0 | 0 | 0 | 0 | 1.6 |
| 2 | Tetraethylammonium Bromide | 0.21 | 0 | 0 | 0 | 0 | 0 | 0 | 3.4 |
| 3 | Tetrabutylammonium Iodide | 0.46 | 0 | 0 | 0 | 0 | 0 | 0 | 0 |
| 4 | Tetrabutylammonium Bromide | 0.20 | 0 | 0 | 0 | 0 | 0 | 0 | 0 |
| 5 | Ethyl triphenylphosphonium Iodide | 0.10 | 0 | 7.1 | 12.3 | 22.0 | 26.0 | — | 25.3 |
| 6 | Polyether B | — | 0 | 0 | 0 | 0 | 1.2 | 34.8 | 63.1 |
| 7 | Zirconium Octoate | 0.05 as metal | 27.0 | — | 26.3 | — | — | — | — |
| 8 | Lithium Naphthenate | 0.004 as metal | 21.3 | — | 20.6 | — | — | — | — |

What is claimed is:

1. A higher molecular weight polyepoxide prepared by reacting (a) a saturated polyepoxide containing at least one vicinal epoxy group, and (b) from about 0.001 to about 10% by weight based on the polyepoxide of a quaternary ammonium compound with a phenol.

2. The composition of claim 1 wherein the saturated polyepoxide is a diglycidyl polyether of hydrogenated 2,2-bis-(4-hydroxyphenyl) propane.

3. The composition of claim 1 wherein the saturate polyepoxide is a hydrogenated diglycidyl polyether of 2,2-bis-(4-hydroxyphenyl) propane.

4. The composition of claim 1 wherein the quaternary ammonium compound is a halide.

5. The composition of claim 4 wherein the quarternary ammonium halide is a tetraalkyl ammonium halide.

6. The composition of claim 5 wherein the tetraalkyl ammonium halide is tetramethylammonium chloride.

7. The composition of claim 5 wherein the tetraalkyl ammonium halide is tetraethylammonium bromide.

8. The composition of claim 5 wherein the tetraalkyl ammonium halide is tetrabutylammonium bromide.

9. The composition of claim 5 wherein the tetraalkyl ammonium halide is tetrabutylammonium chloride.

10. The composition of claim 1 wherein the phenol is a polyhydric phenol.

11. The composition of claim 10 wherein the polyhydric phenol is 2,2-bis(4-hydroxyphenyl) propane.

12. A curable composition comprising the composition of claim 1 and an epoxy curing agent.

* * * * *